D. M. Mefford.
Corn Husker.
No. 962.
Reissued May 15 1860
Fig. 1.
Fig. 2.
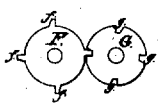
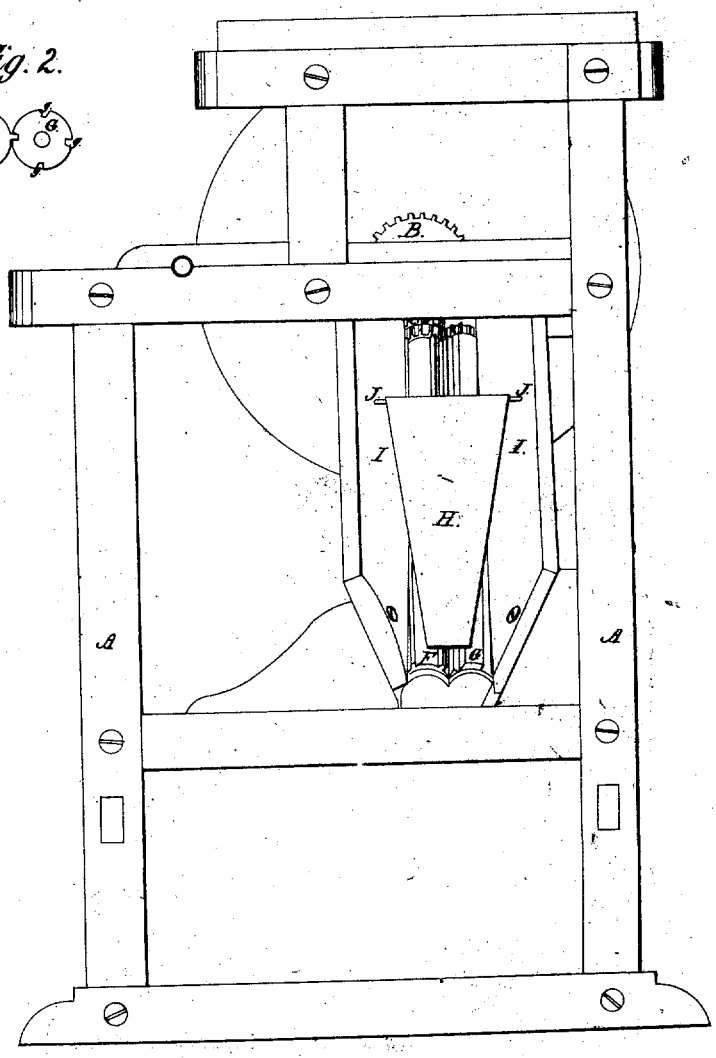
Witnesses,
Jno. W. Clute.
James H. Lindley
Inventor.
D. M. Mefford
per Knight Brothers Attorneys

UNITED STATES PATENT OFFICE.

DAVID M. MEFFORD, OF JEFFERSONVILLE, INDIANA.

IMPROVEMENT IN CORN-HUSKERS.

Specification forming part of Letters Patent No. 18,922, dated December 22, 1857; Reissue No. 962, dated May 15, 1860.

*To all whom it may concern:*

Be it known that I, DAVID M. MEFFORD, of Jeffersonville, in the county of Clarke and State of Indiana, have invented a new and useful Machine for Husking Corn; and I hereby declare the following to be a full and exact description thereof, reference being had to the accompanying drawings, making part of this specification.

The subject of my said invention is a machine composed of one or more pairs of rollers of small size ribbed or grooved longitudinally, or nearly so, in combination with a yielding flap or flaps adapted to press ears of corn against the said rollers.

In the accompanying drawings, Figure 1 is a front elevation of a machine illustrating my invention. Fig. 2 is a transverse section of the rollers.

A is the frame of the machine.

B represents gearing by which motion is communicated to the rollers.

F and G are the husking-rollers geared together so as to rotate in unison in opposite directions. The roller F is formed with ribs *f*, longitudinal or nearly so, and the roller G with corresponding cavities, *g*, which receive the said ribs so as to permit the peripheries of the rollers to come in contact, as plainly exhibited in Fig. 2.

H is the pressure-flap attached at J to the flume I, and pressing or springing toward the rollers F G at its lower end. The flume I is set slightly on one side of a central position in respect to the rollers F and G, in order to present the ears more fully to the action of the roller F, so as to cause their continuous rotation in one direction. The attachment J of the flap H may be a hinge, and the lower end of the said flap may be pressed toward the rollers by a spring, or the said spring may, if preferred, form the attachment, the attachment J being dispensed with.

The operation is as follows: The ears are forwarded to the husking mechanism through a hopper or by other suitable means, and, coming in contact with the ribs *f* of the roller F, are thereby rapidly rotated, their husks being at the same time caught between the peripheries of the two rollers and torn from the ears. The flap H exerts a yielding pressure against the ears, so as to keep them in contact with the rollers, and so long as any husk remains upon the ear its escape is impossible; but when the husk is completely removed, the smooth surface of the corn offering but slight resistance to the descent of the ear, it is pressed downward by those entering above and escapes.

It is found in practice that rollers thus constructed and combined crimp the husks between them and hold them so as to effectually strip them from the ears, and prevent the escape of the latter while any husk remains upon them, and that rollers of diameter not much exceeding that of the largest ears, and with ribs of from an eighth to a quarter of an inch in height, have no liability to shell or injure the corn.

The rollers and flap may be placed in any position preferred.

I do not desire to limit my claim to the precise form of the several parts, as it is obvious that this may be varied without departing from the principle of the invention.

I claim as new and of my invention herein—

The combination of husking-rollers and pressure-flap, operating substantially as and for the purpose set forth.

In testimony of which invention I hereunto set my hand.

DAVID M. MEFFORD.

Witnesses:

GEO. H. KNIGHT,

OCTAVIUS KNIGHT.